United States Patent
Pasqua

(10) Patent No.: US 9,945,438 B2
(45) Date of Patent: Apr. 17, 2018

(54) BICYCLE FRONT DERAILLEUR BODY AND DEVICE FOR ADJUSTABLE REST OF SUCH DERAILLEUR BODY ON A TUBE OF A BICYCLE FRAME

(75) Inventor: Paolo Pasqua, Camisano Vicentino (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 13/462,608

(22) Filed: May 2, 2012

(65) Prior Publication Data
US 2012/0280097 A1    Nov. 8, 2012

(30) Foreign Application Priority Data
May 2, 2011 (EP) .................................. 11425121

(51) Int. Cl.
| F16L 3/10 | (2006.01) |
| F16D 69/02 | (2006.01) |
| B62M 9/135 | (2010.01) |
| B62L 1/16 | (2006.01) |
| C08L 27/16 | (2006.01) |

(52) U.S. Cl.
CPC ............. *F16D 69/026* (2013.01); *B62L 1/16* (2013.01); *B62M 9/135* (2013.01); *C08L 27/16* (2013.01); *F16D 2200/0069* (2013.01)

(58) Field of Classification Search
USPC ................... 248/274.1; 474/78, 80, 81, 82
See application file for complete search history.

(56) References Cited

U.S. PATENT DOCUMENTS

| 4,031,936 A * | 6/1977 | Curtis ........................ 411/134 |
| 4,237,743 A * | 12/1980 | Nagano ........................ 474/82 |
| 6,146,298 A * | 11/2000 | Nanko ........................ 474/80 |
| 6,270,124 B1 | 8/2001 | Nanko |
| 7,722,487 B2 | 5/2010 | Ichida et al. |
| 7,789,351 B2 * | 9/2010 | Auer ........................ 248/74.3 |
| 8,002,655 B2 | 8/2011 | Meggiolan |
| 2007/0117666 A1* | 5/2007 | Ichida et al. ................ 474/80 |
| 2008/0200793 A1* | 8/2008 | Furue et al. ................ 600/393 |
| 2010/0102185 A1* | 4/2010 | Jenestreet ................ 248/218.4 |

FOREIGN PATENT DOCUMENTS

| CN | 1150387 C | 10/2000 |
| CN | 100515857 C | 8/2005 |
| CN | 100560425 C | 5/2007 |
| EP | 1787902 | 5/2007 |
| JP | 62177594 U | 11/1987 |

OTHER PUBLICATIONS

European Search Report, Appln. No. EP 11425121.8-1254, dated Oct. 19, 2011.
Taiwanese Office Action for Application No. 101115471, dated Apr. 15, 2016 with English translation.

* cited by examiner

*Primary Examiner* — Joanne Silbermann
(74) *Attorney, Agent, or Firm* — Volpe and Koenig, P.C.

(57) ABSTRACT

A device for connecting a front derailleur to the front tube of a bicycle. The device is fixed to the derailleur and the front tube at a predetermined position and includes an adjustable rest for contacting the front tube and positioning the derailleur.

18 Claims, 5 Drawing Sheets

BICYCLE FRONT DERAILLEUR BODY AND DEVICE FOR ADJUSTABLE REST OF SUCH DERAILLEUR BODY ON A TUBE OF A BICYCLE FRAME

CROSS REFERENCE TO RELATED APPLICATION

This application claims the benefit of European Patent Application No. 11425121.8, filed on May 2, 2011, which is incorporated herein by reference as if fully set forth.

BACKGROUND

The present invention refers to a bicycle front derailleur body, as well as to a device for adjusting its position on a bicycle frame.

In the context of this description and of the following claims, the bicycle derailleur of interest is the front one, which moves the chain between the different crowns associated with the crank arms. The movement of the chain is typically actuated through movement of a suitable thrusting member, commonly known as fork cage, associated with an operation kinematic mechanism.

In addition to the most common bicycle derailleurs, which are manually operated, there are also derailleurs with motorised operation in which the movement of the cage is carried out by a suitably controlled driving member, typically electrically controlled.

In any case, the front bicycle derailleurs comprise a derailleur body where the cage is mounted with the respective operation kinematic mechanism. The derailleur body is fixed to the bicycle frame, typically to the so-called seat tube of the frame (i.e. the one located under the saddle).

In the prior art the fixing of the derailleur body is carried out through coupling between a suitable support element projecting from the seat tube (typically welded on it) that forms a shaped seat for a corresponding coupling portion of the derailleur body. The coupling is completed by tightening a nut that locks the coupling portion to the support element.

At the end, the derailleur body is mounted substantially cantilevered on the projecting support element of the seat tube.

The Applicant has pointed out that the known coupling between derailleur body and seat tube has various drawbacks the main one being that, on the occasion of gearshifting, the positioning of the derailleur body with respect to the seat tube can undergo variations.

This occurs due to the fact that a reaction force acts on the derailleur body, the reaction force being substantially equal and opposite to the force applied by the cage on the bicycle chain, which determines a stress—on the coupling portion of the derailleur body and on the support element of the seat tube—such as to be able to induce a deformation of the coupling portion and of the support element. This deformation in turn causes a variation of the position of the derailleur body, which is pushed towards the seat tube. This movement of the derailleur body depends on the tension of the chain: the cyclist, especially a professional one, does not slow down pedalling on the occasion of gearshifting, for which reason the stress of the chain on the cage is high and the force that must be applied by the cage to move the chain is correspondingly high.

The result is that, since the derailleur body moves itself, the position of the relative cage acting on the chain also changes, which causes imprecision in gearshifting, which can even cause the chain to fall. This type of drawback is particularly serious in the case of derailleurs with motorised operation, in which the gearshifting precision is essential, since the cyclist cannot make any kind of correction or adjustment as he can do, on the other hand, by acting on the manual operation of a conventional non-motorised derailleur.

The technical problem at the basis of the present invention is to provide a bicycle front derailleur body that keeps a correct position in every condition of use and that therefore ensures a high precision and speed of gearshifting, so as to overcome the drawbacks mentioned above with reference to the prior art in a simple and effective manner.

BRIEF DESCRIPTION OF THE DRAWING

Further characteristics and advantages of the present invention will become clearer from the following detailed description of a preferred embodiment thereof, made with reference to the attached drawings and given for indicating and not limiting purposes. In such drawings.

DESCRIPTION OF THE PREFERRED EMBODIMENTS

Introduction

Figure 1:
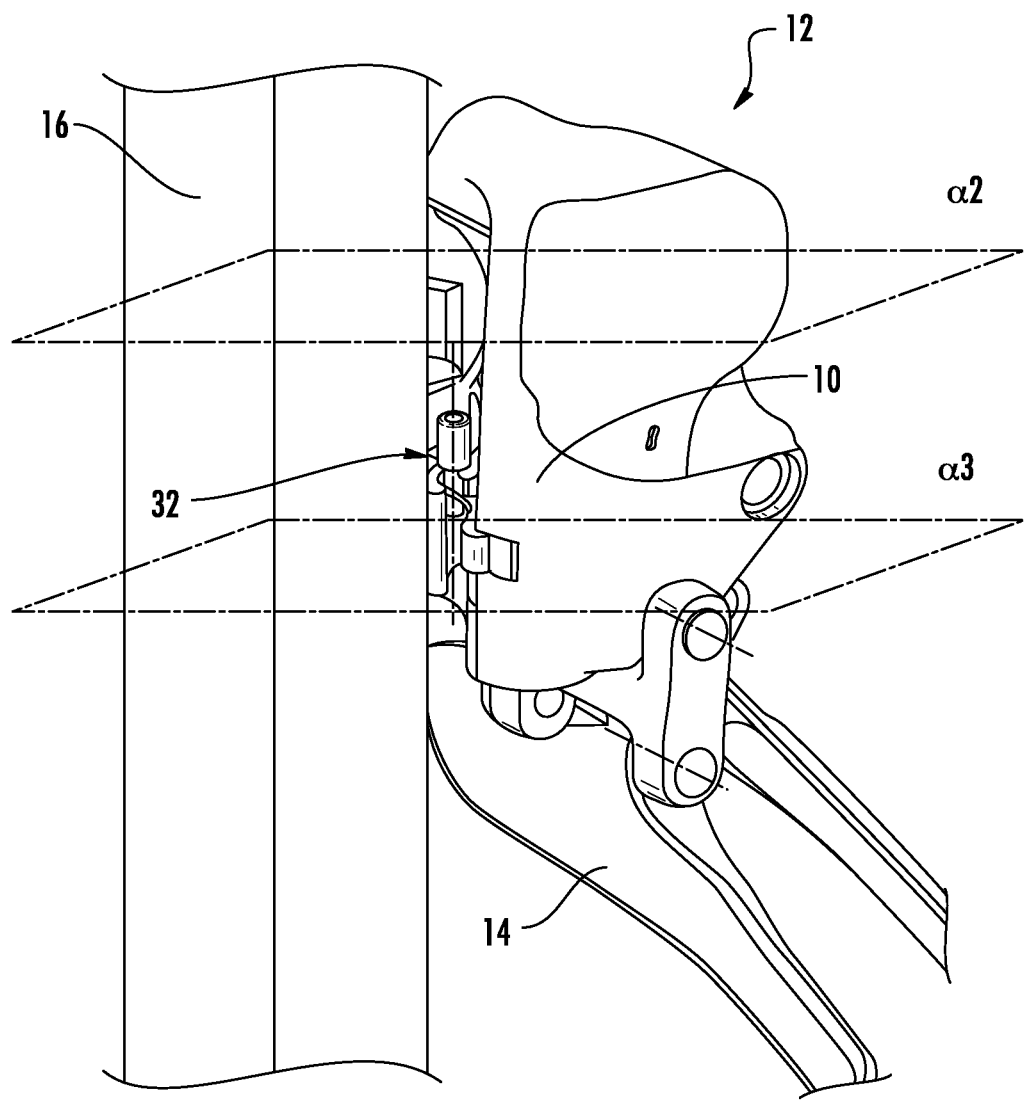
FIG. 1 schematically represents a perspective view of a bicycle front derailleur, mounted on a tube of a bicycle frame and comprising a derailleur body according to the present invention.

The present invention concerns, in a first aspect thereof, a bicycle front derailleur body that is intended to operate a cage, said derailleur body coupled to a suitable support element projecting from a tube of a bicycle frame. The coupling includes:

a fixed part, fixed to said derailleur body at a portion thereof located at a predetermined distance from said coupling portion;

a mobile part, mounted angularly mobile on said fixed part and comprising a rest portion against said tube; and a fastener for fixing said mobile part with respect to said fixed part in a desired operative angular position, so that said rest portion is substantially in contact with said tube.

Advantageously, the aforementioned device allows the derailleur body to keep its correct position in every phase of use, thanks to the rest portion of the mobile part that is adjusted to go into contact with the tube of the frame (such an adjustment operation is carried out when the derailleur is mounted on the frame and the operator fixes the mobile part with respect to the fixed part in the operative angular position suitable for the specific situation). In this way, the derailleur body is still mounted cantilevered at its coupling portion to the tube, but it is also substantially at its portion located at the predetermined distance from the coupling portion.

In other words, the cantilevered coupling between derailleur body and tube is stiffened thanks to the aforementioned adjustable rest, which is located at a free space arranged between the tube, typically circular in shape, and the derailleur body, which is coupled cantilevered to the support element of the tube, with the coupling portion of the derailleur body typically provided on a side surface of the derailleur body itself.

Moreover, the derailleur body with the aforementioned adjustable rest has the advantage of being able to be mounted on the frame extremely quickly; the same adjustable rest can also be used with different types of front derailleurs (both manually operated and motorised), as well as with tubes of different dimensions.

Preferably, between the fixed part and the mobile part of the derailleur body according to the invention a separation spring separates the fixed and mobile parts from one another. In this way, advantageously, the operator can mount adjustable rest even more quickly, firstly loosening the aforementioned means for fixing and allowing the mobile part to rest itself on the tube, and then fixing the reached operative angular position with the same means for fixing.

Preferably, the fixed part is fixed to the derailleur body through a screw located in a through opening thereof. In this way, the same adjustable rest can be used for different types of front derailleurs.

Alternatively, the fixed part is made in one piece with the derailleur body, to further reduce the mounting time.

Preferably, the means for fixing of the present invention comprise a screw, located at a pivoting axis of the mobile part with respect to the fixed part, inserted in a through hole formed in one from the mobile part and the fixed part and in screwing engagement in a threaded seat realized in the other between the mobile part and the fixed part. Advantageously, the operator can thus loosen the screw to position the mobile part in the desired operative position (if the aforementioned separating spring is provided, such positioning is practically automatic), and tighten it to fix the aforementioned reached position.

Preferably, the means for fixing comprise an anti-loosening or lock washer, mounted at the pivoting axis around the screw.

In a preferred embodiment of the invention, the separation spring is a torsion spring located substantially parallel to the aforementioned pivoting axis. Preferably, such a torsion spring is mounted around a support pin mounted on one of the mobile part and the fixed part.

The rest portion of the mobile part of the adjustable rest of the invention is preferably coated with elastomeric material, so as not to damage the tube of the frame against which it rests.

The fixed part of the adjustable rest of the invention preferably comprises a matching appendix, suitable for coupling to a corresponding recess provided on the derailleur body. Advantageously the operator can thus quickly and precisely identify, on the derailleur body, the position in which to locate the fixed part and its correct orientation; moreover, during the fixing through screwing, the matching appendix helps to keep the fixed part still in position, avoiding a rotation thereof.

In a second aspect thereof, the present invention concerns a bicycle front derailleur comprising a derailleur body of the type described above.

Preferably, such a front derailleur has, individually or in combination, all of the structural and functional features discussed above with reference to the aforementioned derailleur body and therefore it has all of the aforementioned advantages.

In a third aspect thereof, the present invention concerns a bicycle comprising a derailleur body of the type described above.

Preferably, such a bicycle has, individually or in combination, all of the structural and functional features discussed above with reference to the aforementioned derailleur body and therefore it has all of the aforementioned advantages.

In a fourth aspect thereof, the present invention concerns an adjustable rest on a bicycle frame for securing a front derailleur body in substantially a cantilevered arrangement with respect to for the frame. The adjustable rest being characterised in that it comprises:

a fixed part, fixed to said derailleur body at a portion thereof located at a predetermined distance from said coupling portion;

a mobile part, mounted angularly mobile on said fixed part and comprising a rest portion against said tube; and means for fixing said mobile part with respect to said fixed part in a desired operative angular position, so that said rest portion is substantially in contact with said tube.

Preferably, such a device for adjustable rest can have, individually or in combination, analogous structural and functional features to those discussed above with reference to the device for adjustable rest of the derailleur body of the invention and therefore it has all of the aforementioned advantages.

DETAILED DESCRIPTION OF THE PREFERRED EMBODIMENTS

With initial reference to FIGS. 1, 2, 2a, 3 and 4, a bicycle front derailleur body in accordance with the present invention is shown, wholly indicated with 10.

The body 10 is part of a bicycle front derailleur 12 that is intended to operate a cage 14 and that is mounted on a tube 16 of a bicycle frame, typically on the seat tube of the frame.

Figure 2:
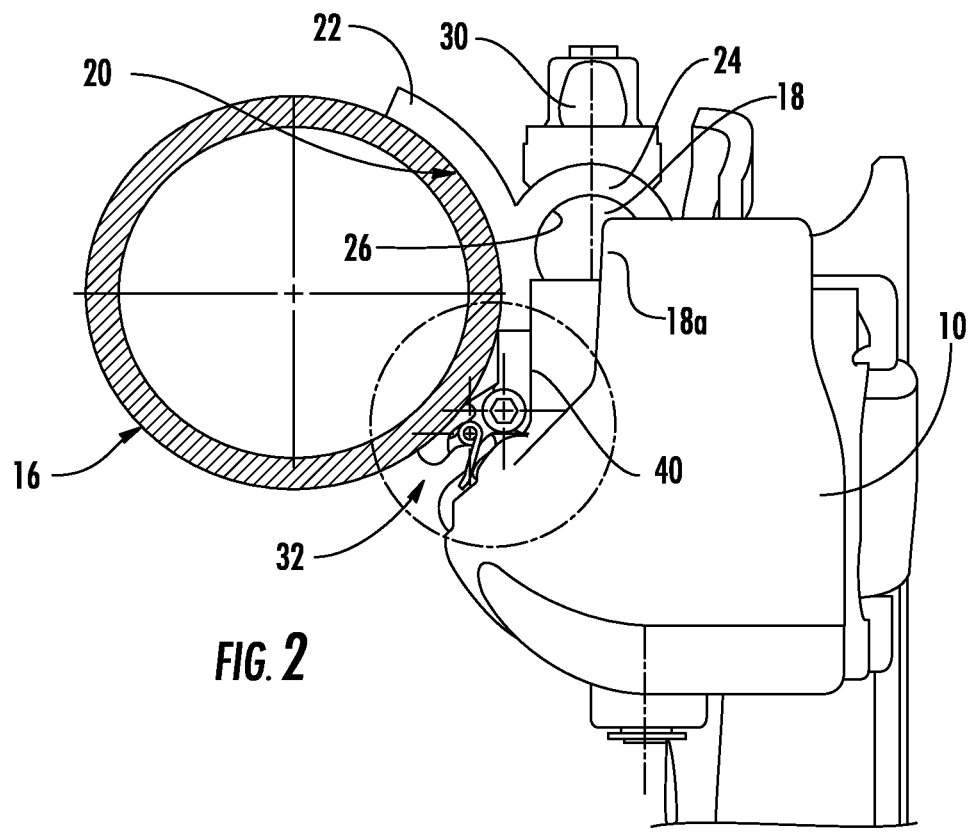
FIG. 2 schematically represents a cross section of the derailleur of FIG. 1, taken according to the plane marked as $\alpha 2$.
Figure 2A:
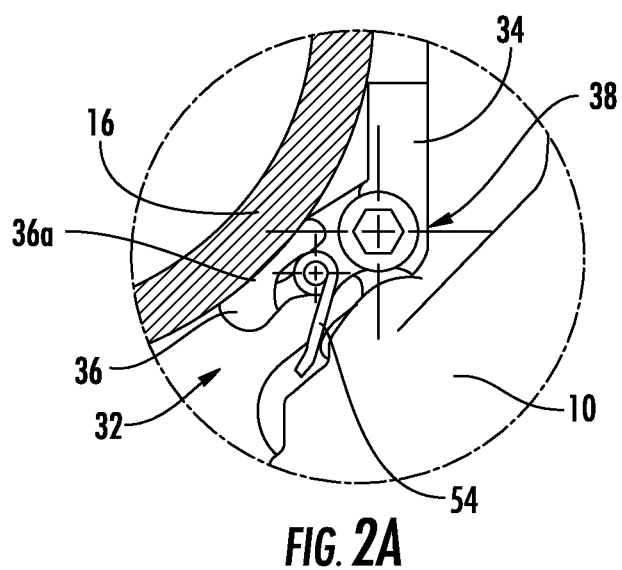
FIG. 2a schematically represents an enlarged detail of FIG. 2, contained in the dotted and dashed circle of FIG. 2.
Figure 3:
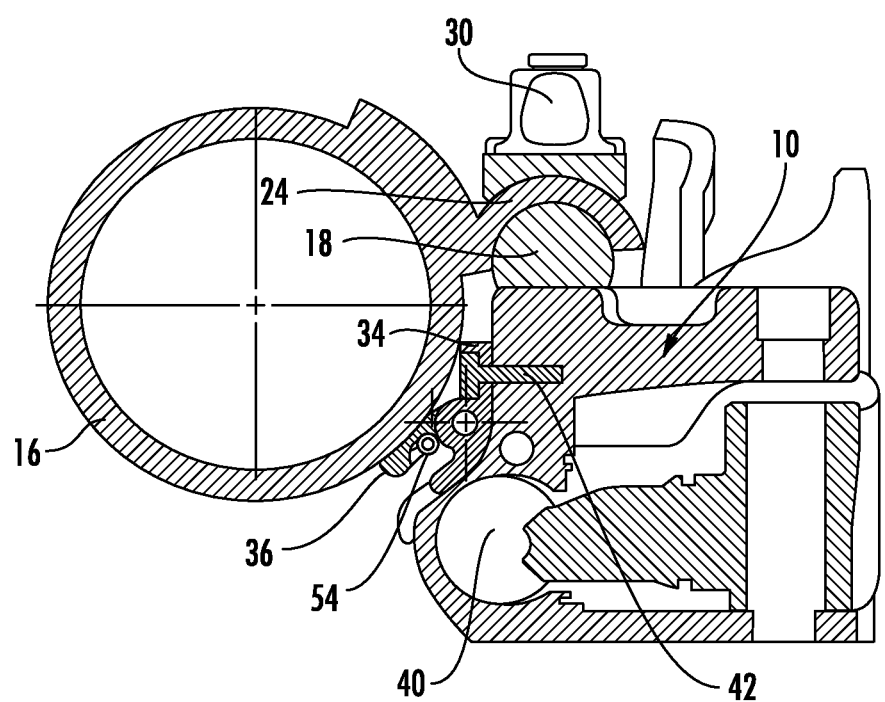
FIG. 3 schematically represents a cross section of the derailleur of FIG. 1, taken according to the plane marked as $\alpha 3$.

In the example illustrated in FIGS. 1-3 the tube 16 has a circular section.

In particular, the body 10 comprises a coupling portion 18 to a suitable support element 20 projecting from the tube 16 of the frame. The support element 20 is per se conventional and comprises an attachment portion 22 to the tube 16, typically welded on it, and a coupling portion 24 that carries a shaped seat 26 (in the example of FIGS. 1-3, it is substantially semicylindrical shaped) for the coupling with the corresponding coupling portion 18 of the body 10 (in the example of FIGS. 1-3, it is shaped like a cylinder portion). The coupling is completed by tightening a nut 30 (or analogous locking means) that locks the coupling portion 18 to the shaped seat 26.

The coupling portion 18 of the body 10 is typically provided on a side surface 18a of the body 10 itself, so that also the coupling portion 18 projects from the body 10 and at the end the body 10 is mounted substantially cantilevered on the support element 20 of the tube 16.

In accordance with the present invention, the body 10 comprises an adjustable rest 32 for the body 10 on the tube 16.

The device 32 of the invention comprises a fixed part 34, a mobile part 36 and a fastener means 38, such as shouldered screw, for fixing the mobile part 36 with respect to the fixed part 34. The fixed part 34 is fixed to the body 10 at a predetermined distance, such as location 40, from the coupling portion 18, whereas the mobile part 36 is mounted angularly mobile on the fixed part 34 and comprises a portion 36a that rest against the tube 16. The fastener 38 fixes the mobile part 36 with respect to the fixed part 34 in a desired operative angular position, so that the rest portion 36a is substantially in contact with the tube 16. In an embodiment, the fixed part 34 corresponds to a first portion, the mobile part 36 corresponds to a second portion, and the rest portion 36a corresponds to a contact portion.

In this illustrated non-limiting example, the fixed part 34 is fixed to the body 10 through a screw 42 located in a through opening 44 thereof. Alternatively, the fixed part can be made in one piece with the body 10. The shouldered screw is located at a pivoting axis A-A of the mobile part 36 with respect to the fixed part 34.

Figure 5A:
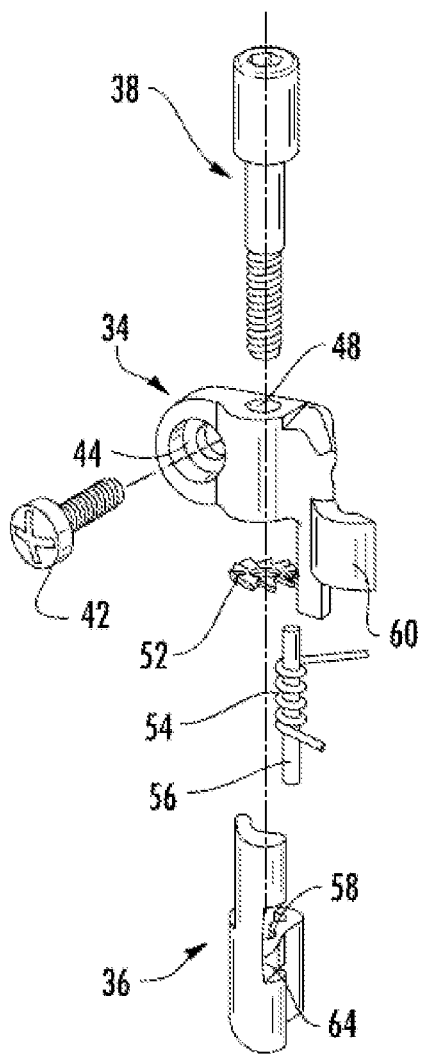
Figure 5B:
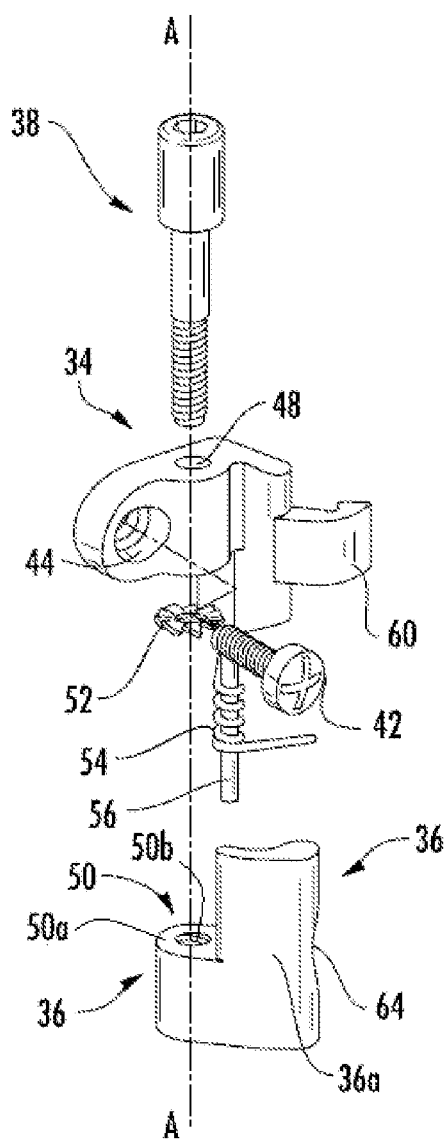

In particular, as clearly illustrated in FIGS. 5a and 5b that show the device 32 in detail, the screw (that preferably has an Allen head) is inserted in a through hole 48 formed in the fixed part 34 and is in screwing engagement in a threaded seat 50 comprising a seat portion 50a and a threaded portion 50b realized in the mobile part 36. On the whole, the mobile part 36 is L-shaped with the rest portion 36a provided along one side of the "L" and the threaded seat 50 comprising a seat portion 50a and a threaded portion 50b provided transversally at the other side of the "L".

Alternatively, the screw could be inserted in a through hole formed in the mobile part 36 and brought into screwing engagement in a threaded seat in the fixed part 34.

In FIGS. 5a and 5b it can be seen that the fastener means 38 also comprise an anti-loosening or lock washer 52 (for example a toothed washer), mounted at the pivoting axis A-A around the screw. In particular, the washer 52 is mounted mediate between the fixed part 34 and the mobile part 36 (in FIGS. 5a and 5b the washer 52 is mounted beneath the through hole 48 of the fixed part 34 and above the threaded seat 50 comprising a seat portion 50a and a threaded portion 50b of the mobile part 36).

Moreover, in FIGS. 5a and 5b it can be seen that between the fixed part 34 and the mobile part 36 a separating spring 54 acts for relatively separating the two parts 34, 36 from one another. In particular, such a spring 54 is a torsion spring located substantially parallel to the pivoting axis A-A.

In this illustrated non-limiting example, the torsion spring 54 is mounted around a support pin 56 mounted on the mobile part 36, at a suitable hole 58. Alternatively, in an embodiment that has not been illustrated, the spring 54 is mounted around a support pin mounted on the fixed part 34, at a suitable hole.

Figure 4:
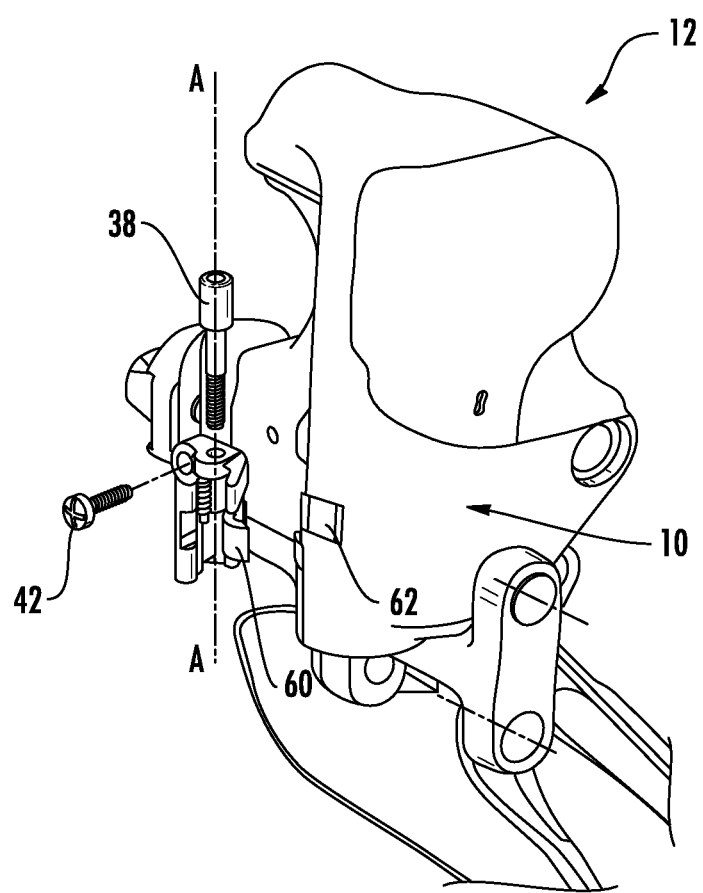
FIG. 4 schematically represents a perspective view of the derailleur of FIG. 1, with the relative device for adjustable rest shown not yet mounted on the derailleur body; and, FIGS. 5a and 5b schematically represent perspective, exploded views of the device for adjustable rest included in the derailleur body of FIG. 1, taken from two different angles.

Moreover, it should be noted that the fixed part 34 of the device 32 comprises a matching appendage 60, suitable for coupling to a corresponding recess 62 provided on the body 10, which is clearly shown in FIG. 4. From FIGS. 5a, 5b it can also be seen that the mobile part 36 has a recess 64 to avoid interference of the mobile part 36 on the matching appendage 60 of the fixed part 34, when the mobile part 36 has an angular position with minimum angle with respect to the fixed part 34.

Preferably, the rest portion 36a is coated with elastomeric material.

The operation of the adjustable rest 32 of the body 10 of the invention can be clearly seen from what has been discussed above and is given here in the preferred succession of operative steps.

The adjustable rest 32 is initially positioned with the mobile part 36 folded on the fixed part 34 so that the relative angular position of the parts 34, 36 has a substantially minimum angle. The screw is initially tightened so as to hold the aforementioned position.

The operator then mounts the fixed part 34 on the body 10, with the screw fastener 42, and mounts the body 10 on the support element 20 of the tube 16 with the nut 30.

The operator then loosens the screw so that the torsion spring 54 moves the mobile part 36 away from the fixed part 34 until the rest portion 36a comes into contact with the tube 16.

At this point, the operator tightens the screw to fix the operative angular position reached in the previous operative step.

Finally, it should be noted that the present invention also refers to the bicycle front derailleur 12 and to a bicycle comprising the body 10 discussed above, as well as to the aforementioned adjustable rest 32 of the body 10 on the tube 16.

Of course, one skilled in the art can bring numerous modifications and variants to the bicycle front derailleur body and to the adjustable rest based on the inventions described above, in order to satisfy specific and contingent requirements, all of these modifications and variants are in any case covered by the scope of protection of the present invention as defined by the following claims.

What is claimed is:

1. An adjustable assembly for locating a bicycle front derailleur on a bicycle tube, the adjustable assembly comprising:
   a support element that mounts a derailleur body on a bicycle tube having a first axis; and,
   an adjustable rest having:
      a first portion that is fixed to said derailleur body at a predetermined position so that there is no relative movement between said first portion and said derailleur body;
      a second portion that includes a contact portion configured to rest against said bicycle tube, said second portion is mounted on said first portion and remains angularly mobile with respect to said first portion; and
      a first threaded fastener that has a second axis that is parallel to the first axis and fixes said second portion with respect to said first portion so that said contact portion rests against said bicycle tube and said derailleur is retained in a desired location when said derailleur is mounted on said bicycle tube.

2. The adjustable rest according to claim 1, wherein said first portion has a through opening and is fixed to a derailleur body by a second fastener located in said through opening.

3. The adjustable rest according to claim 1, wherein said first portion is formed as a part of said derailleur body.

4. The adjustable rest according to claim 1, wherein at least one of said first and section portions has a through hole and the other of said first and second portions has a fastener seat located on a pivoting axis and the first threaded fastener passes through said through hole and into engagement with said fastener seat.

5. The adjustable rest according to claim 4, wherein an anti-loosening washer is mounted around the first threaded fastener.

6. The adjustable rest according to claim 1, wherein said contact portion is coated with elastomeric material.

7. The adjustable rest according to claim 1, wherein said first portion includes an appendage for coupling to a corresponding recess provided on said derailleur body.

8. A bicycle including the adjustable rest according to claim 1.

9. A device for adjusting a rest position of a bicycle front derailleur body on a tube of a bicycle frame having a first axis, said derailleur body comprising a coupling portion mountable to a support that projects from said tube and fixes said derailleur body substantially cantilevered with respect to said tube, said device for adjusting said rest position of said front derailleur comprising:
   a fixed part, fixed to said derailleur body at a portion thereof located at a predetermined distance from said coupling portion;
   a mobile part that includes a contact portion configured to rest against said bicycle tube, said mobile part is mounted on said fixed part and remains angularly mobile with respect to said fixed part; and
   a first threaded fastener for fixing said mobile part with respect to said fixed part in a desired operative angular position and the first threaded fastener has a second axis that is parallel to the first axis, so that said rest portion is substantially in contact with said tube and said derailleur is retained in the desired location, when said adjustable assembly is mounted on said bicycle frame.

10. A device for adjusting the rest position of a bicycle front derailleur that has a derailleur body with a coupling portion that connects to a support projecting from a tube of a bicycle frame having a first axis and positions a derailleur body substantially cantilevered with respect to a tube of a bicycle frame, said device for adjusting the rest position of a bicycle front derailleur comprising:
   a fixed member configured for attachment to a derailleur body at a predetermined distance from a coupling portion of said derailleur body;
   a mobile member that includes a contact portion configured to rest against said bicycle tube, said mobile member is connected to said fixed member and remains angularly mobile with respect to the fixed member; and
   a first threaded fastener has a second axis that is parallel to the first axis and connects said mobile member to said fixed member part so that said mobile member is angularly mobile with respect to said fixed member and said contact portion contacts said tube and retains said derailleur in a desired rest position when said derailleur is mounted on said tube of a bicycle frame.

11. An adjustable assembly for locating a bicycle front derailleur on a bicycle tube, the adjustable assembly comprising:
   a support element that mounts a derailleur body on a bicycle tube; and,
   an adjustable rest having:
      a first portion that is fixed to said derailleur body at a predetermined position so that there is no relative movement between said first portion and said derailleur body;
      a second portion that is mounted on said first portion and configured so that said second portion is angularly mobile with respect to said first portion and said second portion includes a contact portion that is configured to rest against said bicycle tube; and
      a first fastener that fixes said second portion with respect to said first portion so that said contact portion rests against said bicycle tube and said derailleur is retained in a desired location when said derailleur is mounted on said bicycle tube, wherein a biasing member that is independent from said first portion and said second portion is located between said first and second portions and urges them away from each other.

12. An adjustable assembly for locating a bicycle front derailleur on a bicycle tube, the adjustable assembly comprising:
   a support element that mounts a derailleur body on a bicycle tube; and,
   an adjustable rest having:
      a first portion that is fixed to said derailleur body at a predetermined position so that there is no relative movement between said first portion and said derailleur body;
      a second portion that is mounted on said first portion and configured so that said second portion is angularly mobile with respect to said first portion and said second portion includes a contact portion that is configured to rest against said bicycle tube; and
      a first fastener that fixes said second portion with respect to said first portion so that said contact portion rests against said bicycle tube and said derailleur is retained in a desired location when said derailleur is mounted on said bicycle tube, wherein a torsion spring is located between said first and second portions.

13. The adjustable rest according to claim 12, wherein said torsion spring is mounted around a support pin mounted on one of first and second portions.

14. The adjustable rest according to claim 12, wherein said contact portion is coated with elastomeric material.

15. The adjustable rest according to claim 12, wherein said first portion includes an appendage for coupling to a corresponding recess provided on said derailleur body.

16. The adjustable rest according to claim 15, wherein said first portion is formed as a part of said derailleur body.

17. The adjustable rest according to claim 12, wherein at least one of said first and section portions has a through hole and the other of said first and second portions has a fastener seat located on a pivoting axis and the first fastener passes through said through hole and into engagement with said fastener seat.

18. The adjustable rest according to claim 17, wherein an anti-loosening washer is mounted around the fastener.

* * * * *

UNITED STATES PATENT AND TRADEMARK OFFICE
CERTIFICATE OF CORRECTION

PATENT NO. : 9,945,438 B2
APPLICATION NO. : 13/462608
DATED : April 17, 2018
INVENTOR(S) : Paolo Pasqua It is certified that error appears in the above-identified patent and that said Letters Patent is hereby corrected as shown below:

On the Title Page

1. In Item (75), under "Inventor", in Column 1, Line 1, delete "Vicentino (IT)" and insert -- Vicentino – VI (Vicenza) (IT) --, therefor.

In the Specification

2. In Column 2, Line 14, delete "DRAWING" and insert -- DRAWINGS --, therefor.

In the Claims

3. In Column 6, Line 55, in Claim 4, delete "first and section" and insert -- first and second --, therefor.
4. In Column 8, Line 48, in Claim 17, delete "first and section" and insert -- first and second --, therefor.

Signed and Sealed this
Twenty-sixth Day of June, 2018

Andrei Iancu
*Director of the United States Patent and Trademark Office*